C. F. HRADECKY.
SPOOL HOLDER.
APPLICATION FILED DEC. 16, 1913.
1,149,263.
Patented Aug. 10, 1915.
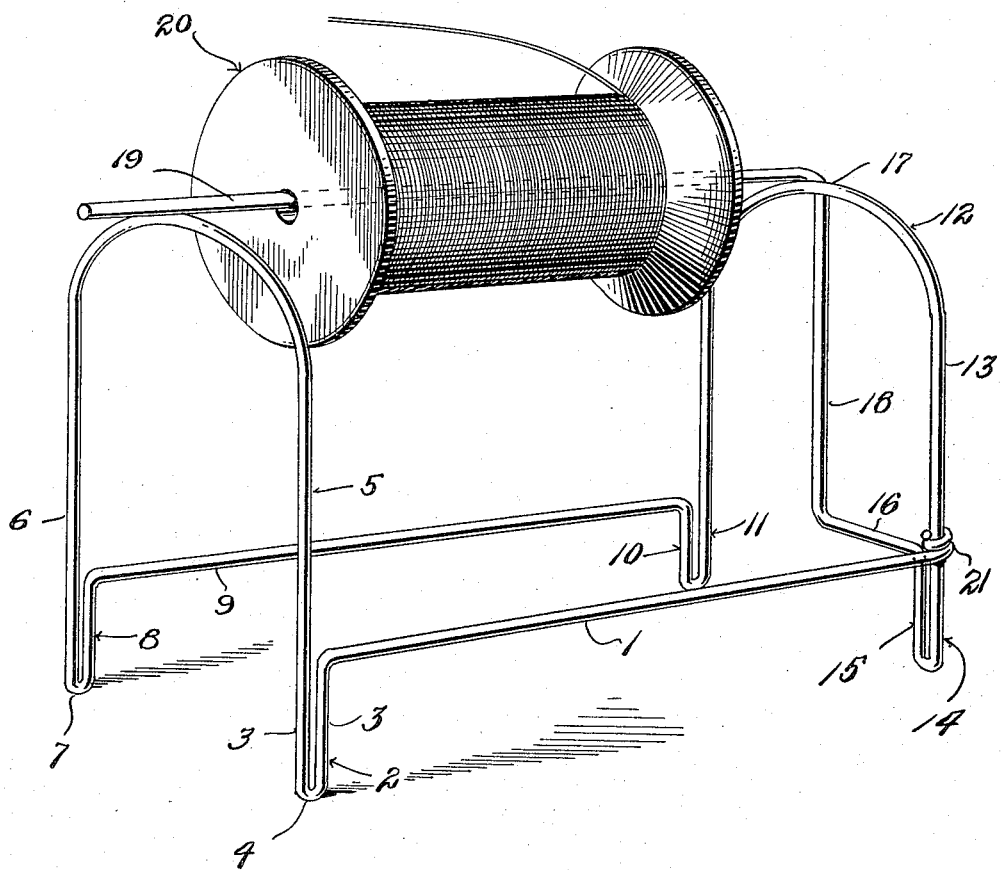
Witnesses
Inventor
C. F. Hradecky
By
Attorneys

UNITED STATES PATENT OFFICE.

CHARLES F. HRADECKY, OF FLEMING, COLORADO.

SPOOL-HOLDER.

1,149,263. Specification of Letters Patent. Patented Aug. 10, 1915.

Application filed December 16, 1913. Serial No. 807,083.

*To all whom it may concern:*

Be it known that I, CHARLES F. HRADECKY, a citizen of the United States, residing at Fleming, in the county of Logan, State of Colorado, have invented certain new and useful Improvements in Spool-Holders; and I do hereby declare the following to be a full, clear, and exact description of the invention, such as will enable others skilled in the art to which it appertains to make and use the same.

The present invention is directed to improvements in spool holders, and has for its object to provide a device of this character which may be formed from a single length of wire.

A further object of the invention is to provide a spool holder so constructed that a spool may be engaged therewith and removed therefrom and when a spool is engaged upon the holder the same will be permitted to unwind as the thread is used.

A still further object of the invention is to provide a spool holder which is exceedingly simple in construction and one which may be manufactured at a minimum cost.

With these and other objects in view, this invention resides in the novel features of construction, formation, combination and arrangement of parts to be hereinafter more fully described, claimed and illustrated in the accompanying drawing, in which the figure represents a perspective view of the device.

The holder is formed from a single length of suitable wire, and is so bent as to provide a horizontal bar 1, one end of which terminates in a loop 2, the arms 3 of which being closely arranged so as to provide a supporting leg 4.

The loop 2 terminates in an upwardly extending U-shaped member 5, the arm 6 of which terminates in a loop 7 which constitutes a supporting leg 8, said leg being arranged directly opposite the leg 4.

The loop 7 terminates in a horizontal bar 9, which is disposed in spaced parallel relation with the bar 1, said bar terminating in a loop 10 which constitutes a supporting leg 11.

The loop 10 has one of its arms terminating in a U-shaped member 12, which is held in spaced relation with respect to the yoke 5 by the bars 1 and 9. The arm 13 of the yoke 12 terminates in a supporting leg 14, the arm 15 of which terminates in a horizontal portion 16, the inner end of which stops at a point directly below the greatest point of curvature of the bight portion 17 of the member 12.

The inner end of the portion 16 terminates in a vertical rod 18 which is bent over the bight portion 17 of the member 12 and terminates in a spindle 19, the free end of which being adapted to rest upon the bight portion of the member 5, and as the holder is made of wire the spindle 19 contains sufficient resiliency to permit the free end thereof to be moved from engagement with the member 5 so that the spool 20 may be rotatably mounted upon the spindle, and when the free end of the spindle rests upon the bight portion of the member 5 accidental disengagement of said spool is prevented.

So as to impart the proper rigidity to the holder the bar 1 has one of its ends twisted around the supporting leg 14 as clearly shown at 21.

From the foregoing description it is obvious that the holders may be made in different sizes for holding spools of different sizes.

What is claimed is:—

A spool holder consists of a single length of wire so bent as to provide parallel bars, loops formed adjacent the ends of the bars to provide supporting legs, said loops having certain of their arms terminating in upwardly extending U-shaped members, one of said loops having an arm extending in a horizontal direction at right angles to the parallel bars, said arm terminating at its inner end in a vertical bar, the upper end of which is bent over the bight portion of one of the U-shaped members, and terminates in a resilient spindle which rests upon the bight portions of the U-shaped members and is constructed and arranged to rotatably support the spool, as and for the purpose set forth.

In testimony whereof, I affix my signature, in the presence of two witnesses.

CHARLES F. HRADECKY.

Witnesses:
LORON E. DAVIS,
MARIE A. DAVIS.

Copies of this patent may be obtained for five cents each, by addressing the "Commissioner of Patents, Washington, D. C."